April 4, 1961            B. MINIX            2,977,788
PNEUMATIC INTERNAL GAUGE DEVICE
Filed April 14, 1958
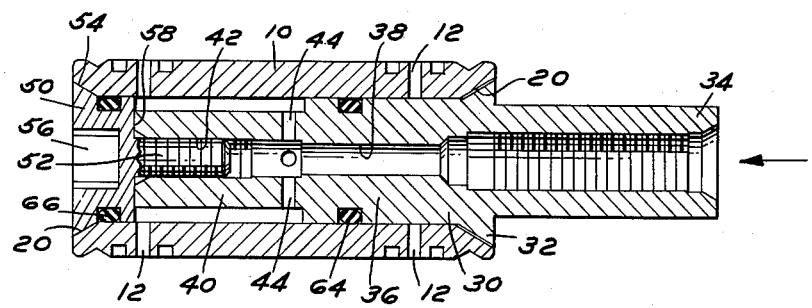
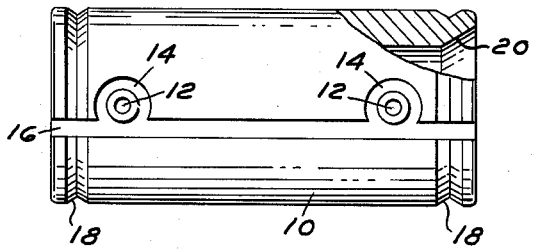
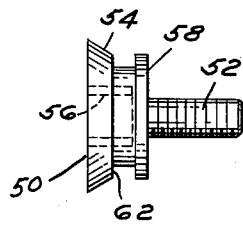
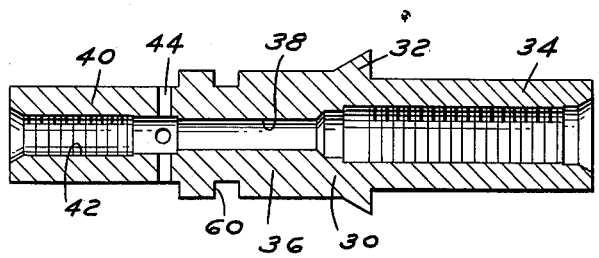
INVENTOR.
BILL MINIX
BY
Barnes, Kisselle, Raisch & Choate
ATTORNEYS

United States Patent Office 2,977,788
Patented Apr. 4, 1961

2,977,788
PNEUMATIC INTERNAL GAUGE DEVICE

Bill Minix, Detroit, Mich., assignor to Freeland Gauge Company, Detroit, Mich., a corporation of Michigan Filed Apr. 14, 1958, Ser. No. 728,368

6 Claims. (Cl. 73—37.9)

This invention relates to a gauge device and has particularly to do with a gauge insert which is used for extremely accurate measuring.

It is important, of course, that gauge plugs and inserts be as free from wear as possible so that they will maintain their accuracy over a long period of time. In connection with the use of air gauges where apertures are provided in the wall surfaces of gauges to check clearance, it has been known in the past to use solid carbide inserts or plugs provided with suitable air apertures. These, of course, have the disadvantage of high cost due not only to the material itself, but to the difficulties in providing the necessary openings throughout the carbide to permit the passage of air.

One attempt to solve this problem of cost was the brazing of a cylindrical carbide sleeve on a steel core. This, however, created a problem of expansion and contraction due to the heat necessary for the brazing operation and frequently resulted in the carbide cracking loose from the core during the cooling of the parts so that air leaks developed which resulted in inaccuracy. Also in a brazed product of this kind, there is always a strain problem which may contribute to cracking of the carbide.

The present invention has for its object the improvement of these devices which permits still the use of carbide as a wear surface but avoids the difficulties resulting from the brazing on of carbide and also the difficulties of solid carbide.

Briefly, the present invention contemplates the use of a separable core which supports the carbide in a manner which avoids strain thereon and yet it insures accurate passage of air to the checking ports on the carbide.

Other objects and features of the invention will be apparent in the following description and claims.

In the drawings:

Figure 1 illustrates the assembly of parts for the device;
Figure 2 illustrates the sleeve itself;
Figure 3 shows one portion of the core;
Figure 4 shows another portion of the core.

Referring to the drawings, the carbide sleeve or tube is shown at 10 having suitable air ports 12 surrounded by the moat passages 14 connected by an axial passage 16. At the ends of the tube are annular grooves 18 intersected by passage 16. It will be seen that the tube is provided on its inner surface at the ends with conical relief areas 20. These are provided for the reception of centers to permit accurate grinding of the tube prior to its use. The carbide for the manufacture of this tube can be purchased in tubular form and cut to length.

The support for the tube consists of a main body portion 30 of cylindrical configuration with a conical flange 32 centrally thereof having on one side a hollow stem 34 and on the other side a cylindrical portion 36 provided with a central bore 38. On the end of the cylindrical portion 36 is another stem portion 40 having a threaded recess 42. Diametrical air passages 44 lead from the outer surface of the portion 40 to the bore 38.

The other portion of the central core comprises a plug part 50, having a threaded shaft portion 52 to be received in the threaded passage 42. The head portion of the plug member 50 has a conical edge 54 and is centrally provided with a recess 56 for an Allen wrench or other suitable tool. The plug portion 50 has a shoulder portion 58 which provides a positive stop when the two parts are screwed together. It will be seen that each of the core portions 30 and 50 has an annular groove 60 and 62, respectively, to receive O-rings 64 and 66.

When the parts are assembled as shown in Figure 1 and the plug portion 50 is screwed solidly into the core portion 30 until the parts contact at 58, the device is assembled for operation; and the apertures 12 at the left hand end of the assembly, as shown in Figure 1, are open to the annular passage around the cylindrical portion 40 so that air passing into the core through the stem 34 will pass outwardly through the passages 44 into the metering passages 12 on either side of the gauge sleeve 10.

The parts are preferably dimensioned so that there is some axial clearance between the sleeve 10 and the conical flange portions 32 and 54. The reason for this is that the part will not be bound on the core to the extent that it cannot rotate if it becomes locked in a work piece and is subjected to twist action by the operator. The core will rotate in the sleeve and can be removed by disassembling the parts. Also, this arrangement avoids any strain on the carbide sleeve since it is floatingly supported on the O-rings 64 and 66, having a slight clearance between the inner diameter of the sleeve 10 and the outer diameter of the portion 36 and the plug 50 adjacent the O-rings. This avoids any distortion of the carbide sleeve in assembly and yet permits leak proof air passages to the metering ports.

It will be seen that the ports 12 at the right hand end of the sleeve 10 are not connected to the air passages. It is possible to turn the sleeve end for end on the core and utilize the other end after the first end becomes worn to any degree.

What I claim is as follows:

1. A gauge comprising, a shell formed of a high wear material, first means to support said shell comprising a core member having air passages leading to the inner walls of said shell, and second means resiliently to support said shell on said core member, said second means serving also to seal said air passages, said core member comprising a spool-shaped member having lands spaced apart to position said shell axially, and air outlet passageways in said shell leading to the inner walls of said shell between said lands, said second means comprising circular resilient rings interposed between the inner surface of the shell and the outer surface of the spool-shaped member.

2. A gauge as defined in claim 1 in which the spool-shaped member is composed of separable parts to permit removal and replacement of said shell.

3. A gauge as defined in claim 2 in which the shell is cylindrical in shape and has conical relieved portions at each end of its inner surface, and said lands of said spool-shaped member are shaped to conform to said relieved portions.

4. A gauge as defined in claim 3 in which the spool-shaped member has annular grooves for receiving said resilient rings.

5. A gauge as defined in claim 1 in which said spool-shaped member is composed of separable parts, one having an axial passageway open at both ends, and the other serving to close and seal said passageway at one end, and radial passageways in one of said parts leading to the surface of the spool-shaped member between said lands.

6. A gauge comprising, a shell formed of carbide having cylindrical inner and outer surfaces, said outer surface having an axial passage connected with a moat passage surrounding an air outlet in said shell, a core member to position said shell comprising a spool having ends to interfit with the outer ends of the inner surface of said shell, said spool having air passages to connect with the air outlet of said shell, means to resiliently support said shell on said core member and to seal said air passages comprising circular resilient rings interposed between the inner surface of the shell and the outer surface of the spool, and means to lock said shell and said core member against axial displacement.

References Cited in the file of this patent
UNITED STATES PATENTS

| | | |
|---|---|---|
| 1,487,834 | Blood | Mar. 25, 1924 |
| 2,358,769 | Aller | Sept. 19, 1944 |
| 2,360,058 | Hohwart | Oct. 10, 1944 |
| 2,360,705 | Moore | Oct. 17, 1944 |
| 2,490,375 | Rupley | Dec. 6, 1949 |
| 2,637,200 | Adkins | May 5, 1953 |
| 2,826,909 | Schmidt et al. | Mar. 18, 1958 |